L. E. GRISWOLD.
AUTOMOBILE HEADLIGHT LENS.
APPLICATION FILED NOV. 3, 1916.
1,317,872.
Patented Oct. 7, 1919.
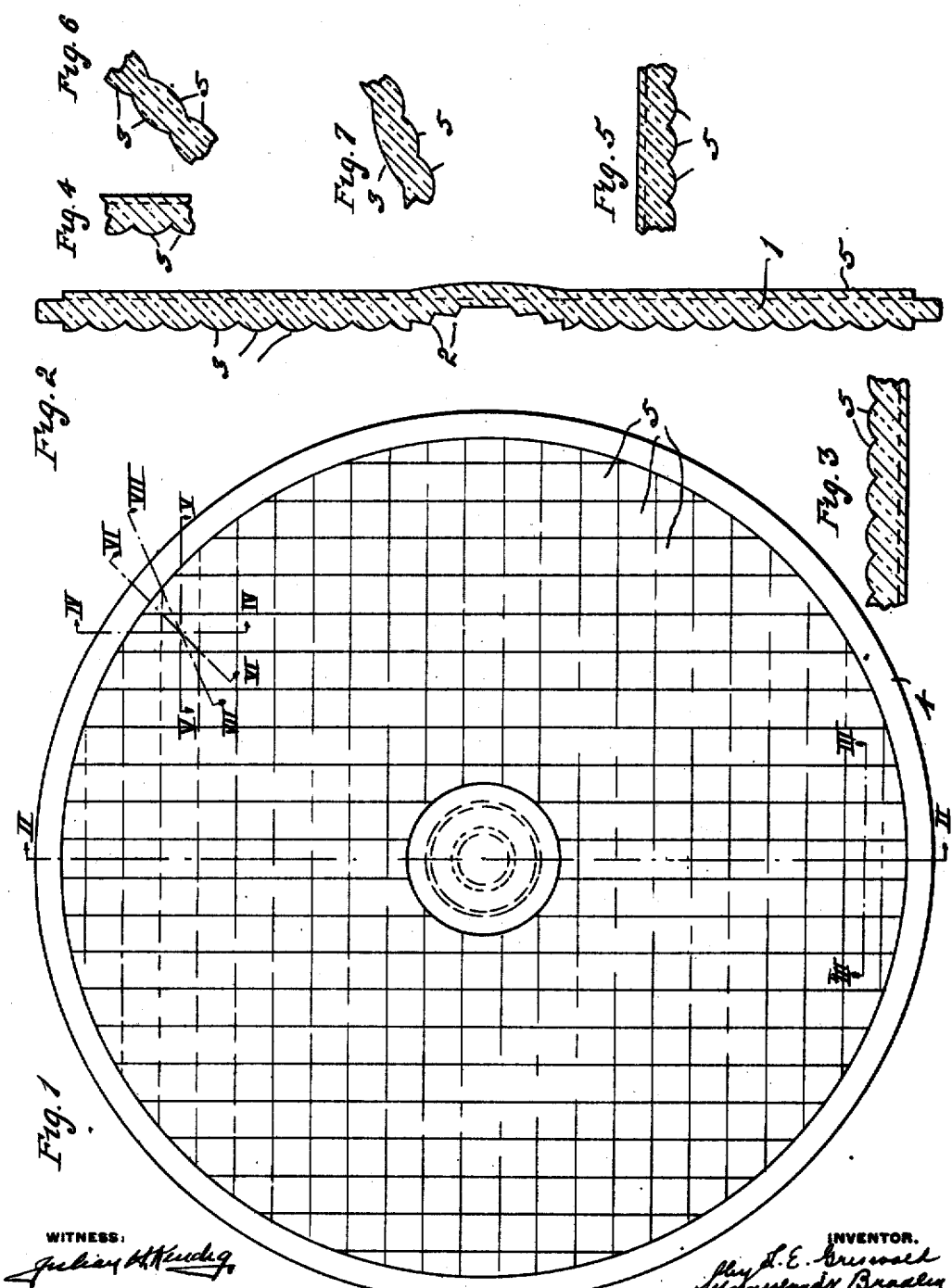

UNITED STATES PATENT OFFICE.

LESTER E. GRISWOLD, OF NEW YORK, N. Y., ASSIGNOR TO MACBETH-EVANS GLASS COMPANY, A CORPORATION OF PENNSYLVANIA.

AUTOMOBILE-HEADLIGHT LENS.

1,317,872.     Specification of Letters Patent.     Patented Oct. 7, 1919.

Application filed November 3, 1916. Serial No. 129,326.

*To all whom it may concern:*

Be it known that I, LESTER E. GRISWOLD, a citizen of the United States, residing at New York, in the county of New York and State of New York, have invented certain new and useful Improvements in Automobile-Headlight Lenses, of which the following is a specification.

The invention relates to automobile headlight lenses. It has for its primary objects; (1) the provision of a lens which will diffuse the light passing therethrough uniformly and present a pleasing appearance from the front; (2) the provision of a lens of the character specified provided with means for throwing a powerful beam of light of relatively small cross-section far ahead of the machine on which the lens is used; and (3) the provision of a lens of cheap simple construction wherein the body of the glass is divided into a large number of sub-lenses, that diffuse the light, and at the same time retain the lens effect of each sub-division, so that the light is projected forwardly a maximum distance but without the blinding glare characteristic of the ordinary automobile headlight. One embodiment of the invention is illustrated in the accompanying drawings, wherein—

Figure 1 is a face view of the lens; Fig. 2 is a section on the line II—II of Fig. 1; and Figs. 3, 4, 5, 6, and 7 are sections on the lines III—III, IV—IV, V—V, VI—VI, and VII—VII of Fig. 1.

Referring to the drawings, 1 is the plate or body portion of the lens which plate is provided at its central portion with a plurality of concentric refracting ridges 2 which serve to bring the rays of light passing through this portion of the glass into parallelism and project the light a considerable distance in front of the machine on which the light is used.

On the rear side of the lens are the parallel refracting ridges 3, such ridges being convex, as indicated in Fig. 2, and extending across from one side of the lens to the other and terminating at the edge portion 4.

The other or front side of the plate 1 is provided with a second series of convex ridges 5 (Fig. 3), which ridges extend at right angles to the ridges 3.

This construction in effect divides the plate into a plurality of small square lenses, the curvature of which will be readily seen by reference to Figs. 4, 6 and 7. These sub-lenses are double convex and serve to bring the rays passing through them into substantial parallelism. The effect of the subdivision, however, is to break up the main body of light into a plurality of beams, approximately parallel but all separated, so that a diffusion of the light is secured. The glare from the headlight is thus eliminated, but at the same time the efficiency of the light is maintained and the distance to which the light is projected forwardly is increased as compared with other types of diffusing lenses, in which the rays are not brought into parallelism.

The placing of one set of ridges on the back of the lens and the other on the front, renders the lens easy of construction and gives it a characteristic appearance. The two sets of ridges are preferably placed at right angles and made similar and uniform, but the construction is capable of considerable modification in these particulars and the ridges might be so arranged as to produce sub-divisions of various shapes and sizes, this being a mere matter of design.

What I claim is:

1. A lens comprising a circular glass plate provided on one side with a set of substantially parallel convex ridges, and on the other side with another set of substantially parallel convex ridges, extending transversely of the first set, and a circular portion at the center of the plate for refracting the rays of light passing therethrough into parallelism.

2. A lens comprising a circular glass plate provided on one side with a set of substantially parallel ridges and on the other side with another set of substantially parallel ridges extending transversely of the first set, and a circular portion at the center of the plate for refracting the rays of light passing therethrough into parallelism.

3. A headlight lens comprising a single substantially flat circular plate having its front face formed with a set of convex ribs adjacently disposed in substantial parallelism one with the other, and on its rear face with a similar set of ribs extending transversely of the first set, thereby providing in said plate a series of double convex subdivisions, said ribs terminating near peripheral portions of the plate.

4. A lens comprising a flat circular plate provided on one face thereof with a set of convex ribs having their sides joined and parallel, and on the other face thereof with a similar set of convex ribs extending transversely at right-angles to the first set, thereby providing in the lens a plurality of subdivisions substantially uniform in cross-section, said ribs terminating near the periphery of the plate.

5. A lens comprising a single flat circular plate having its front face formed with a set of convex ribs having their sides joined and parallel, and on its rear face with a similar set of ribs extending transversely of the first set, said ribs being uniform in width and having the same convexity, substantially as described and for the purposes set forth.

6. A headlight plate or lens comprising a body portion having a series of parallel ridges on one side thereof, each of said ridges being a section of a cylinder, and a series of similar ridges formed on the opposite side of the plate, said second-named series being at right angles to the first-named series.

7. A headlight plate or lens comprising a body portion having a series of parallel ridges on one side thereof, each of said ridges being a section of a cylinder, and a series of similar ridges formed on the opposite side of the plate, said second-named series being at right angles to the first-named series, the edges of adjacent ridges being contiguous, thereby forming a series of squares, each square constituting a double convex lens.

LESTER E. GRISWOLD.

Copies of this patent may be obtained for five cents each, by addressing the "Commissioner of Patents, Washington, D. C."